United States Patent
Rai

(10) Patent No.: US 10,212,134 B2
(45) Date of Patent: Feb. 19, 2019

(54) CENTRALIZED MANAGEMENT AND ENFORCEMENT OF ONLINE PRIVACY POLICIES

(71) Applicant: Fortinet, Inc., Sunnyvale, CA (US)

(72) Inventor: Upkar Singh Rai, Surrey (CA)

(73) Assignee: Fortinet, Inc., Sunnyvale, CA (US)

( * ) Notice: Subject to any disclaimer, the term of this patent is extended or adjusted under 35 U.S.C. 154(b) by 118 days.

(21) Appl. No.: 15/228,159

(22) Filed: Aug. 4, 2016

(65) Prior Publication Data
US 2018/0041475 A1    Feb. 8, 2018

(51) Int. Cl.
*H04L 29/06* (2006.01)

(52) U.S. Cl.
CPC ...... *H04L 63/0263* (2013.01); *H04L 63/0245* (2013.01); *H04L 63/20* (2013.01)

(58) Field of Classification Search
CPC ............. H04L 63/0263; H04L 63/0245; H04L 63/0407; H04L 63/102; H04L 63/00; H04L 47/70; G06Q 20/00; G06F 9/455; G06F 9/46; G06F 9/50; G06F 21/604; G06F 21/6245; G06F 9/45558
USPC .............................................. 726/1; 709/217
See application file for complete search history.

(56) References Cited

U.S. PATENT DOCUMENTS

| 2006/0143688 A1* | 6/2006 | Futoransky | H04L 63/102 726/1 |
| 2007/0266079 A1* | 11/2007 | Criddle | G06Q 10/107 709/203 |
| 2014/0115710 A1* | 4/2014 | Hughes | G06F 21/6245 726/26 |
| 2017/0093917 A1* | 3/2017 | Chandra | H04L 63/20 |

* cited by examiner

*Primary Examiner* — Thanhnga B Truong
(74) *Attorney, Agent, or Firm* — Hamilton, DeSanctis & Cha LLP

(57) ABSTRACT

Systems and methods for centralized management and enforcement of online privacy policies of a private network are provided. According to one embodiment, existence of private information contained in a data packet originated by a client device of a private network and destined for a server device external to the private network is identified by a network security device protecting the private network by scanning the data packet for information matching a signature contained within a private information signature database. An online privacy policy of the private network is determined by the network security device that is applicable to the private information with reference to a privacy policy set defined by an administrator of the private network. The online privacy policy is enforced by the network security device on the data packet by performing one or more actions specified by the online privacy policy to the data packet.

14 Claims, 5 Drawing Sheets

CENTRALIZED MANAGEMENT AND ENFORCEMENT OF ONLINE PRIVACY POLICIES

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2016, Fortinet, Inc.

BACKGROUND

Field

Embodiments of the present invention generally relate to the field of network security techniques. In particular, various embodiments relate to the manipulation by firewalls of the privacy policy of a private network.

Description of the Related Art

Users' private network environment information may be collected by network applications or devices. For example, smartphone applications may collect users' location information, contact information, browser histories, calendar details, search histories, voice input, video input, communication histories and the like when the applications are running on a smartphone. Some network applications or network devices may scan the local network and send local network information to third party analytics servers. For example, some smart TVs scan local Digital Living Network Alliance (DLNA) media servers/file servers and send local private network information to a third party for analysis. When the smart TVs are connected to a corporate network, such communications may reveal information regarding the private network environment information to the third party. Some applications also have the capability of sending crash reports to analytics servers. Unpublished codes and internal Uniform Resource Locators (URLs) can be sent to a third party through such crash reports. Network users' online activities may also be tracked by online behavioral tracking tools, such as Hypertext Transfer Protocol (HTTP) cookies, web beacons and the like. An HTTP cookie is a small piece of data sent from a web server to a browser when the browser accesses the website. The HTTP cookie may be stored at the user's client machine. Every time the user loads the website again, the browser sends the HTTP cookie of the website back to the web server to notify the website of the user's previous activity. HTTP cookies are designed to be a reliable mechanism for websites to remember stateful information. When everything is working correctly, cookies cannot carry viruses and cannot install malware on the host computer; however, tracking cookies and especially third-party tracking cookies are commonly used as ways to compile long-term records of an individual's browsing history.

Usually, network applications, operating systems or network devices ask for the right to collect private information when the application is installed on a smartphone, for example. Network applications, operating systems or network devices may also provide options to the users to deny the collecting/sending of private information. It is difficult, however, for a user of a network device to handle the privacy settings separately provided by each individual application. Similarly, for an administrator of a corporate network, it is difficult to handle the privacy settings of a large number devices connected to the corporate network. Therefore, there is a need for a centralized management and enforcement of online privacy policies.

SUMMARY

Systems and methods are described for the centralized management and enforcement of online privacy policies of a private network. According to one embodiment, existence of private information contained in a data packet originated by a client device of a private network and destined for a server device external to the private network is identified by a network security device protecting the private network by scanning the data packet for information matching a signature contained within a private information signature database. An online privacy policy of the private network is determined by the network security device that is applicable to the private information with reference to a privacy policy set defined by an administrator of the private network. The online privacy policy is enforced by the network security device on the data packet by performing one or more actions specified by the online privacy policy to the data packet.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
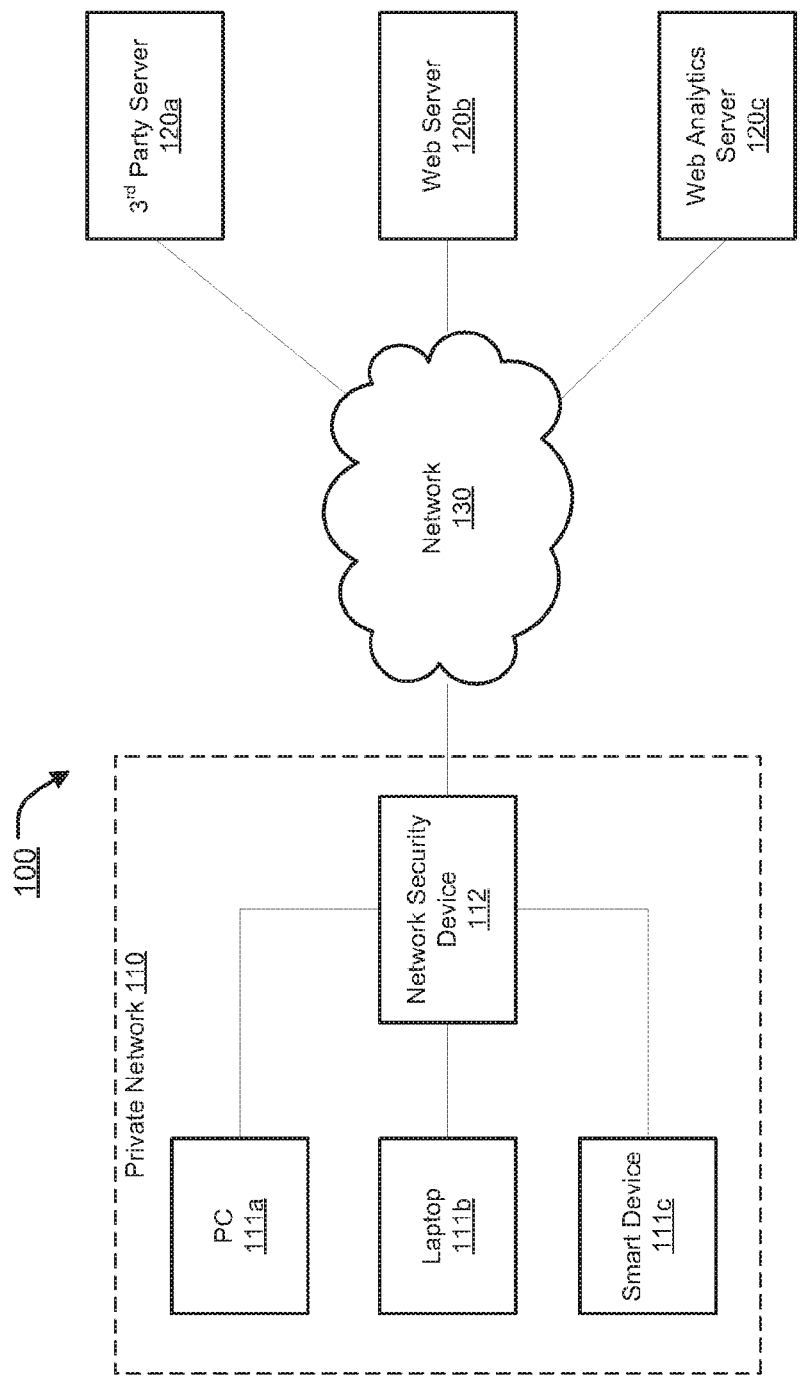
FIG. 1 illustrates an exemplary network architecture in accordance with an embodiment of the present invention.

Systems and methods are described for the centralized management and enforcement of online privacy policies of private network. According to one embodiment, a network security device of a private network captures private information contained in a data packet that is to be transmitted from a client of the private network to a server. The network security device determines an online privacy policy of the private network for the private information and enforces the online privacy policy to the private information.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

If the specification states a component or feature "may", "can", "could", or "might" be included or have a characteristic, that particular component or feature is not required to be included or have the characteristic.

The phrase "security device" generally refers to a hardware device or appliance configured to be coupled to a network and to provide one or more of data privacy, protection, encryption and security. The network security device can be a device providing one or more of the following features: network firewalling, VPN, antivirus, intrusion prevention (IPS), content filtering, data leak prevention, anti spam, anti spyware, logging, reputation-based protections, event correlation, network access control, vulnerability management. load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

FIG. 1 illustrates an exemplary network architecture 100 in which an embodiment of the present invention may be implemented. In the present example, network architecture 100 includes a private network 110 that may connected to external servers 120a-120c through a network 130, which may be any type of network, such as a local area network (LAN), a wireless LAN, a wide area network (WAN), or the Internet. Private network 110 may include multiple network appliances 111, represented by a personal computer (PC) 111a, a laptop 111b and smart device 111c, that may be connected by a local area network of private network 110. A network security device 112 separates the external computing environment, represented by Internet 130, from private network 110. Network security device 112 may intercept communications between network 130 and the network appliances 111 of private network 110 and may, among other things, scan for malware, viruses or high risk network accesses.

In the present example, when network appliances 111a-111c communicate with external servers 120, they may inadvertently transmit private information of users of network appliances 110 or internal information relating to or about private network 110 to external servers 120. For example, when a browser of PC 111a accesses a web server 120b, a cookie that includes personal information of the user of PC 111a may be attached to an HTTP request and transmitted to web server 110b. One or more third-party tracking cookies may also be transmitted to a web analytics server 120c when the browser is accessing web server 120b. A smart device 111c, such as a smart TV, may browse private network 110 and collect internal information regarding private network 110. For example, the smart TV may scan DLNA media servers and File Transfer Protocol (FTP) servers within private network 110 and browse the directories/files shared by DLNA media servers and FTP servers. This internal information about private network 110 may be transmitted to a third-party server 120a. In another example, an application of PC 111a may collect running environment information of PC 111a and transmit the running environment information as part of a crash report to a third-party server 120a for the purpose of analyzing the reason for software crashes. The running environment information may include unpublished program codes and internal information of PC 111a and private network 110 which is not desired by the individual and/or the enterprise to be shared with a third party. Some applications, such as audio assistant applications, may collect personal information of users of network appliances 111 and send this personal information to third party servers for the purpose of improving the assistant applications. Such personal information may include, but is not limited to, location information, location history, contact information, browser history, searching history, calendar information, communication hi story and video/audio input.

In the present example, network security device 112 may detect the existence of private information about private network 110 or users of private network 110 contained in data packets that are to be transmitted out of private network 110. Generally, private information may be identified by corresponding signatures or patterns. When the inspected data packets are encrypted, network security device 112 may conduct deep scanning by decrypting the encrypted data packets in order to detect the private information. Responsive to detecting potential private information within network traffic, network security device 112 may retrieve a corresponding privacy policy that may be pre-defined by the administrator of private network 110. The network traffic carrying the private information may be controlled based on the privacy policy. Details regarding network security device 112 and its ability to centrally manage/control/filter the transmission of private information of a private network will be described below with reference to FIG. 2.

Figure 2:
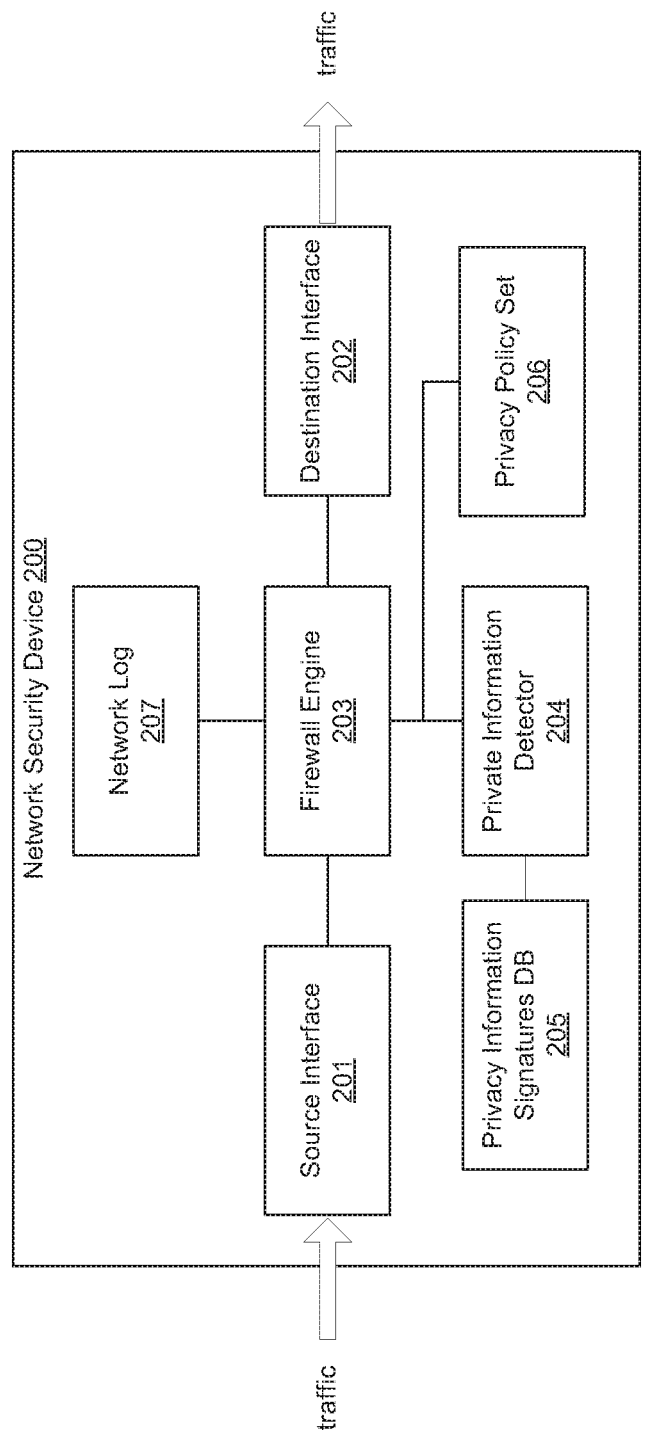
FIG. 2 illustrates exemplary functional units of a network security device that provides centralized management of privacy policies in accordance with an embodiment of the present invention.

FIG. 2 illustrates exemplary functional units of a network security device 200 that provides centralized management of privacy policies in accordance with an embodiment of the present invention. In the present example, network security device 200 comprises a source interface 201, a destination interface 202, a firewall engine 203, a private information detector 204, a private information signature database 205, a privacy policy set 206 and a network log 207.

Source interface 201 is used for receiving network traffic from other network appliances. Usually, source interface 201 may be a LAN interface that connects local network appliances of a private network through a LAN. The network traffic received by source interface 201 is transmitted from the local network appliances to destinations outside the private network. Destination interface 202 is used for transmitting network traffic to its destination. Usually, destination interface 202 may be connected directly or indirectly to a public network, such as the Internet. It shall be apparent to one skilled in the art that source interface 201 and destination interface 202 are not fixed on network security device 200. Any individual or group of logical, virtual or physical network interfaces of network security device 200 may be considered as a source interface or a destination interface in the context of this specification.

Firewall engine 203 is used for scanning the data packets received from source interface 201 and determining whether the transmission of data packets is to be allowed, blocked or logged based on pre-defined network policies. Some other actions, e.g., virus scan, data leak prevention, content filtering and application controlling, may also be taken on the network traffic before it is transmitted to its destination. In the present example, firewall engine 203 detects whether private information is attempting to be transmitted out of the private network and manages the private information based on privacy policies of the private network.

Private information detector 204 is used for scanning data packets received by source interface 201 and identify private information contained in the data packets by matching private information signatures or other mechanisms. If the data packets are encrypted, a deep scan engine may decrypt the data packets in order that private information detector 204 can identify private information from the data packets. For example, private information detector 204 may detect if the source device has the capability to reveal private information. When smart devices known to have the capability to scan internal network are installed at the private network, the IP and/or media access control (MAC) addresses of the smart devices may be registered with private information signatures database 205. IP addresses/domain names of analytics servers and third-party servers that collect private information may also be recorded by private information signatures database 205. When the source IP address of a data packet matched with the registered smart device, private information detector 204 may determine that the data packet may contain private information. In another example, private information detector 204 may identify the application that is transmitting the data packets based on application signatures. If the identified application is an application that has the capability to transmit a crash report to a third party server, private information detector 204 may further check if the data packets contain a crash report and if the crash report contains any sensitive information about the private network. If the identified application is an audio assistant application, private information detector 204 may further check if the data packets contain personal data about users of the private network.

Private information of the private network and personal information of users contained in data packets may be identified by corresponding signatures. Private information signatures database 205 is used for storing signatures or data patterns of private information of an internal network and users. Environment information (e.g., IP/MAC addresses, directories, files, URLs and applications) of servers and other network appliances and private or sensitive information (e.g., unpublished documents, source codes, internal documents) of the private network may be collected by network security device 200 or other asset management devices. The environment information and private information may be listed within an asset table of the private network. Signatures of the private information or sensitive information may be created and stored within private information signatures database 205. Signatures may include data patterns of the private information. Private information detector 204 may scan the data packets using signatures stored within private information signatures database 205 and match the data packets with the data patterns of the signatures. If a data packet is matched with a signature of private information, private information detector 204 may determine the corresponding private information is contained in the data packet. Scanning for the existence of certain information within data packets based on signatures (e.g., patterns, regular expressions and the like) is well known to those skilled in the art and detailed description thereof is omitted for brevity.

Privacy policy set 206 is a collection of network policies that may be defined by the administrator for centrally managing the transmission of private information of the private network. Privacy policy set 206 may define one or more actions that may be taken by firewall engine 203 when private information of the private network is detected within the network traffic at issue. For example, a privacy policy may define an action that blocks network traffic containing a crash report with unpublished codes/URLs. In another example, a privacy policy may define an action that allows a crash report that does not contain any private information be transmitted to a trusted third party server. In a further example, a privacy policy may define an action that logs the network traffic within a network log 207 or notifies the administrator when a private information leak or attempted leak has been detected within the network traffic. In a further example, a privacy policy may define an action that blocks network traffic containing internal network information that is directed to a third party server. In this manner, the administrator can manage crash reports of all computers of the private network at the network end without setting each individual application at each individual computer of the private network. The administrator can prevent smart devices that have the capability of scanning a private network from leaking private network information to third party servers at network security device 200 without setting individual smart devices to disable this capability. Thus, privacy policies of the private network are managed centrally at the network side without requiring time consuming configuration of each network device and/or application.

Privacy policy set 206 may also be used for centrally controlling the transmission of private information of users of the private network. In one example, firewall engine 203 may scan HTTP requests from client machines of the users to detect whether any behavioral tracking tools, e.g., cookies or web beacons, are contained in the requests. A whitelist or blacklist of behavioral tracking tools for users of the private network may be included in privacy policy set 206. If a receiver (the specified destination) of a behavioral tracking tool is contained within the blacklist, the behavioral tracking tool may be removed from the HTTP request or the HTTP request may be blocked. If the receiver of a behavioral tracking tool is in the whitelist, the HTTP request may be allowed by firewall engine 203. For other private information of users, such as contact information, searching histories, browser histories, audio/video inputs and the likes, a whitelist/blacklist may be included in privacy policy set 206. Firewall engine 203 may detect the private information of users in the network traffic and identify the application that is transmitting the private information. If the application and the private information are on the whitelist, the network traffic may be allowed. If the application or the private information are on the blacklist, the network traffic that contains the private information may be blocked by firewall engine 203.

Figure 3:
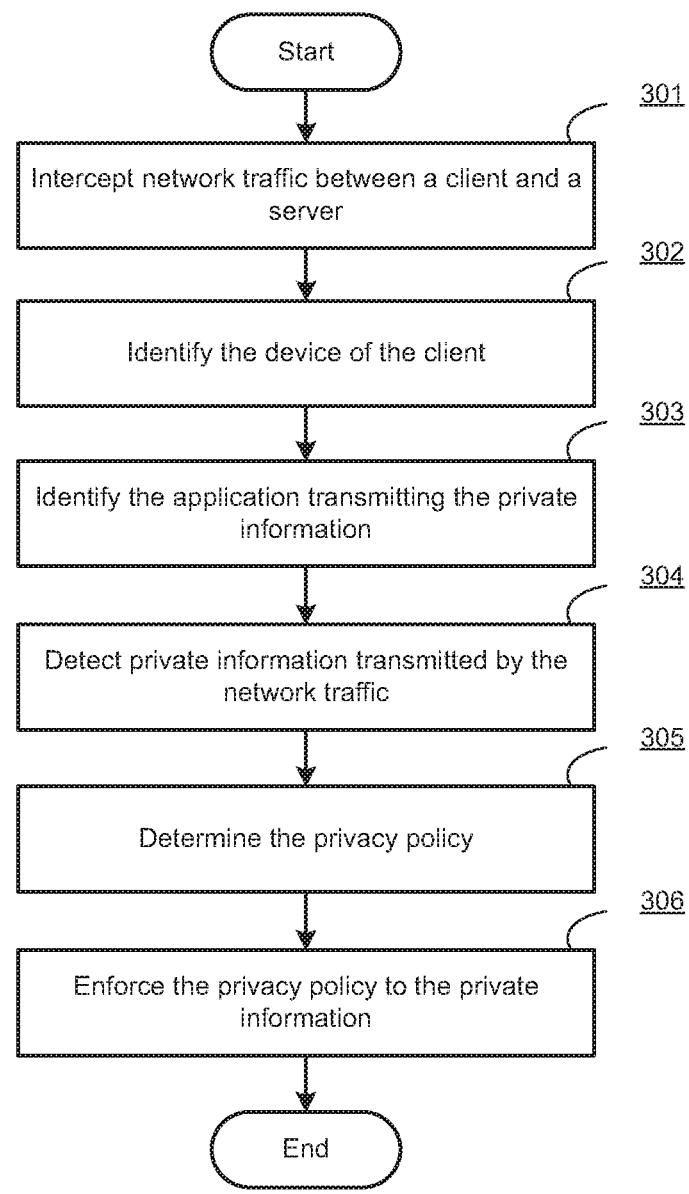
FIG. 3 is a flow diagram illustrating a method for enforcing privacy policies by a network security device in accordance with an embodiment of the present invention.

FIG. 3 is a flow diagram illustrating a method for enforcing privacy policies by a network security device in accordance with an embodiment of the present invention.

At block 301, a network security device, e.g., network security device 200 of FIG. 2, intercepts network traffic attempted to be exchanged between a client device of a private network and an external server residing outside of the private network. Usually, data packets from the client device are received at a source interface of the network security device and scanned before they are routed to a destination interface of the network security device.

At block 302, the network security device may identify information regarding the client device. For example, the network security device may use the source IP address of a data packet to obtain information regarding a type or class of the client device from a device inventory table maintained within the private network. The network security device may further identify the status of the client device that is maintained within the device inventory table. The network security device may determine, for example, whether the client machine is a device that has the capability to inadvertently leak private information. For example, if the client machine is a smart TV, it may have the capability to scan the internal network resource information and send it to an analytics server.

At block 303, the network security device may identify the application of the client device that is sending the data packets based on protocols, tuple information or signatures of the data packets or an application signature. For example, the network security device may identify if the application originating the data packets is an audio assistant application that may have the capability to leak private information to a third party server based on the signature of the audio assistant application. The network security device may also identify if the application has the capability to transmit private information, such as crash reports, to a third party server.

At block 304, data packets from the client device are scanned by the network security device for private information. The private information may be information about the private network including, but not limited to, internal network IP addresses, MAC addresses, domain names, computer names, directories, files of internal servers, unpublished URLs of the private network and unpublished program codes. The private information may be about users of the private networks, including, but not limited to, contact information, browsing histories, searching histories, location information, usages of behavioral tracking tools and audio/video inputs of the users. The network security device may have a private information signature database and match private information signatures of the database with the data packets in order to identify the existence of private information within the data packets.

At block 305, a privacy policy of the private network that is used for controlling the transmission of the private information may be retrieved from a network security policy set based on one or more of the status of client device, the application that is sending the data packets, the private information contained in the data packets, status of the user and the like.

At block 306, the network security device enforces the privacy policy on the network traffic. The network security device may block, allow or log the network traffic based on the privacy policy and/or notify the administrator of the private network of the attempted breach of privacy policy.

Figure 4:
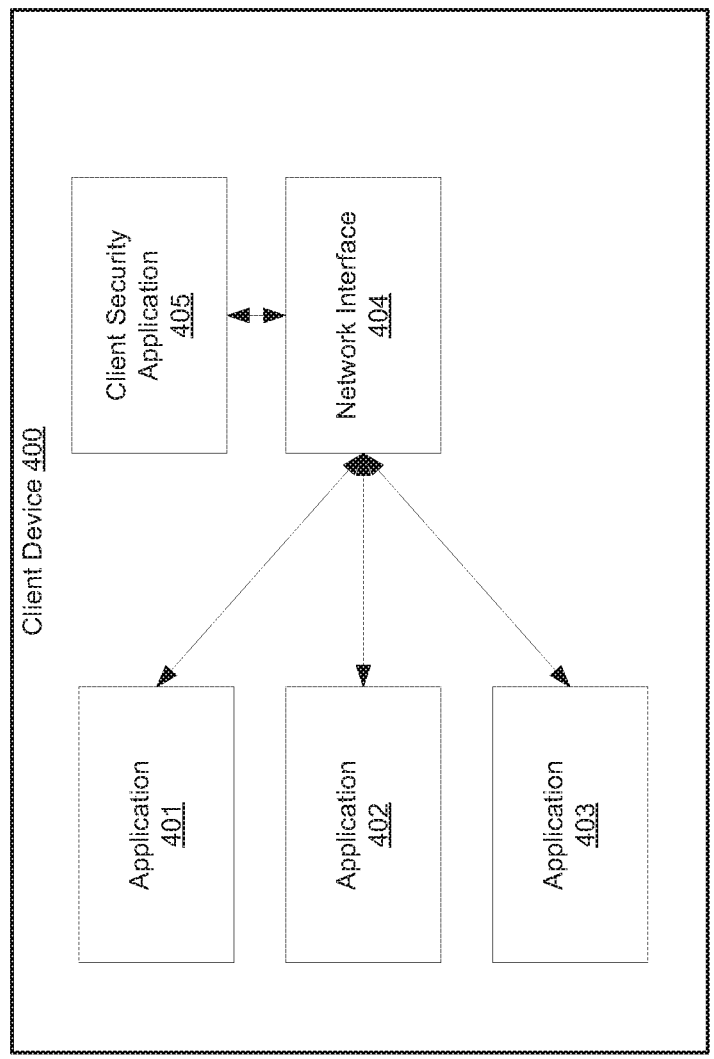
FIG. 4 illustrates exemplary functional units of a client security application that provides centralized management of privacy policies in accordance with an embodiment of the present invention.

FIG. 4 illustrates exemplary functional units of a client security application that provides centralized management of privacy policies in accordance with an embodiment of the present invention. In the present example, a client security application, e.g., the FortiClient endpoint management system available from the assignee of the present invention, may represent the central management application of privacy policy of a client device.

In the present example, a client device 400 includes multiple applications 401-403, a network interface 404 and a client security application 405. Client device 400 may be any network appliance, such as a PC, a laptop or a smart phone on which multiple applications 401-403 are installed. Applications 401-403 may include any system or utility applications including, but not limited to, browsers, audio assistant applications and media players that can collect private information regarding the network to which client device 400 is connected. Applications 401-403 can also collect personal information regarding the user of client device 400. Applications 401-403 may attempt to send private information that is collected at client device 400 to a third party server through network interface 404. Network interface 404 may be a LAN, WLAN interface that may be connected to a local network or a WAN interface that may be connected to a public network using 3G/4G/LTE telecommunication modem.

In the present example, client security application 405 may intercept network traffic transmitted from applications 401-403. In one example, client security application 405 may be a standalone application that may be configured with security engines and network policies that protect client device 400 from viruses, data leakage, malware and private information leaks (privacy policy breaches). The user of client device 400 may configure privacy policies that control the transmission of his/her private information by other applications at client security application 405. In another example, client security application 405 may be connected to a local network security device that is deployed at the border of the private network or a remote/cloud based network security service and retrieve security engines, signatures of private information and network security policies.

The privacy policies configured by the user or retrieved from a remote source may be stored within a local privacy policy repository of client security application 405. When client security application 405 intercepts network traffic between an application and a server, it may scan the data packets and identify the application that is transmitting the network traffic. If the application is one of those known to have the capability to leak private information of the network or the user, client security application 405 may scan the data packets for private information using predefined signatures of such private information. If private information is detected, a privacy policy that corresponds to the private information and/or the application that is transmitting the private information may be retrieved by client security application 405 from the local privacy policy repository. Transmission of the private information may then be controlled based on the corresponding privacy policy. The transmission of the private information may be allowed, blocked or logged by client security application 405. Client security application 405 may also notify the user of client device 400 of the private information leak or attempted leak (online privacy policy breach or attempted breach).

Figure 5:
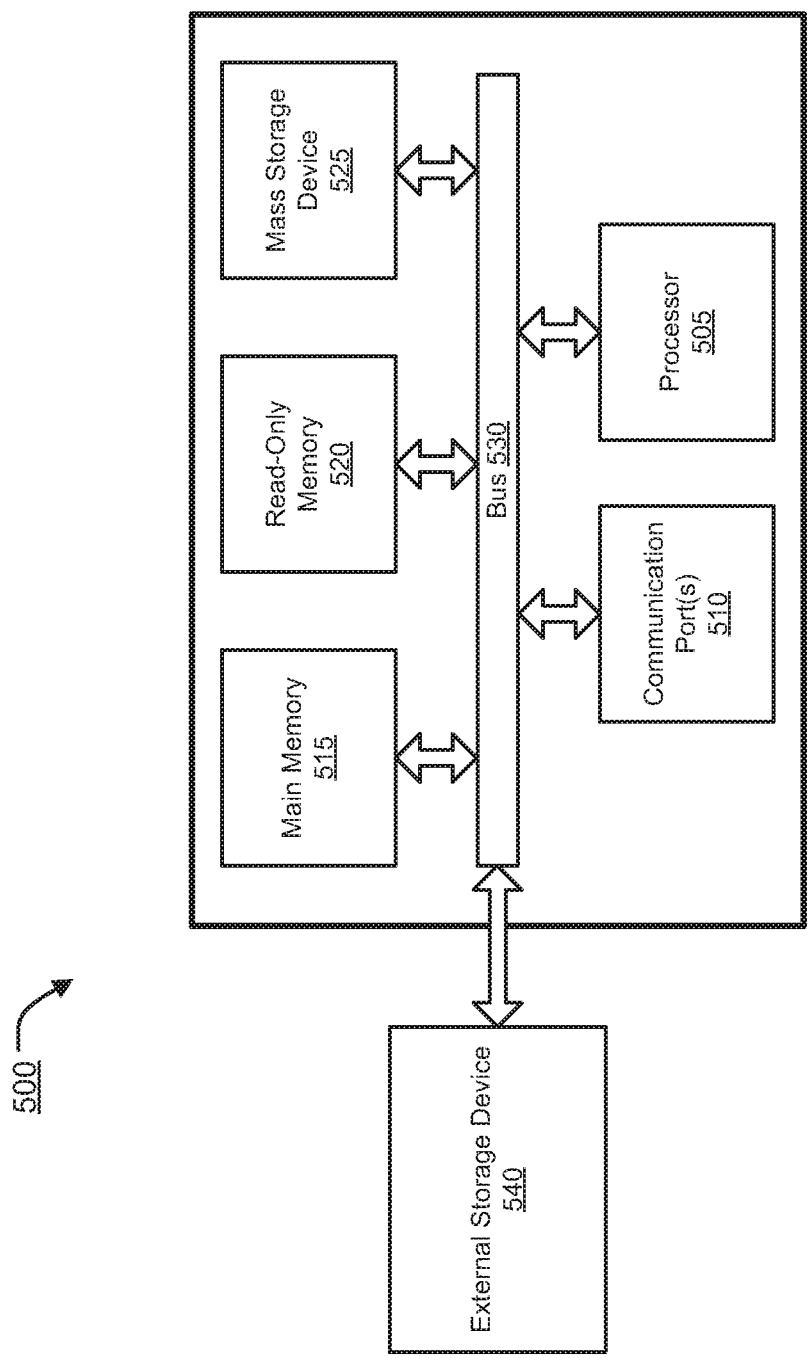
FIG. 5 is an exemplary computer system in which or with which embodiments of the present invention may be utilized.

FIG. 5 is an example of a computer system 500 with which embodiments of the present disclosure may be utilized. Computer system 500 may represent or form a part of a network appliance (e.g., network security device 112 or 200), a server or a client workstation (e.g., client device 400).

Embodiments of the present disclosure include various steps, which will have been described in detail above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 500 includes a bus 530, a processor 505, communication port 510, a main memory 515, a removable storage media 540, a read only memory 520 and a mass storage 525. A person skilled in the art will appreciate that computer system 500 may include more than one processor and communication ports.

Examples of processor 505 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 505 may include various modules associated with embodiments of the present invention.

Communication port 510 can be any of an RS-232 port for use with a modem based dialup connection, a 10/100 Ethernet port, a Gigabit or 10 Gigabit port using copper or fiber, a serial port, a parallel port, or other existing or future ports. Communication port 510 may be chosen depending on a network, such a Local Area Network (LAN), Wide Area Network (WAN), or any network to which computer system 500 connects.

Memory 515 can be Random Access Memory (RAM), or any other dynamic storage device commonly known in the art. Read only memory 520 can be any static storage device(s) such as, but not limited to, a Programmable Read Only Memory (PROM) chips for storing static information such as start-up or BIOS instructions for processor 505.

Mass storage 525 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 530 communicatively couples processor(s) 505 with the other memory, storage and communication blocks. Bus 530 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 505 to system memory.

Optionally, operator and administrative interfaces, such as a display, keyboard, and a cursor control device, may also be coupled to bus 530 to support direct operator interaction with computer system 500. Other operator and administrative interfaces can be provided through network connections connected through communication port 510.

Removable storage media 540 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
    centrally maintaining, by a network security device of a private network, a privacy policy set and a private information signature database by registering with the private information signature database (i) an Internet Protocol (IP) address or a media access control (MAC) address of a smart device known to have the ability to collect information regarding resources associated with the private network and (ii) applications having the ability to transmit crash reports to a third-party server, wherein the privacy policy set is defined by an administrator of the private network and includes a plurality of online privacy policies each specifying one or more actions to take when a particular type of private information is attempted to be transmitted outside of the private network;
    identifying, by the network security device, existence of private information contained in a data packet originated by a client device of the private network and destined for a server device external to the private network by scanning the data packet for information matching a signature contained within the private information signature database, wherein the private information comprises environmental information associated with the private network or runtime information associated with the client device;
    determining, by the network security device, an online privacy policy of the plurality of online privacy policies applicable to the private information; and
    enforcing, by the network security device, the online privacy policy on the data packet by performing the one or more actions specified by the online privacy policy to the data packet.

2. The method of claim 1, wherein the environmental information associated with the private network comprises one or more of:
    local server information of the private network;
    local directory information of the private network;
    an unpublished Uniform Resource Locator (URL) of the private network; and
    unpublished program codes of the private network.

3. The method of claim 1, wherein the server device comprises a web server and the method further comprises:
    capturing, by the network security device, a Hypertext Transfer Protocol (HTTP) request originated by the client device and directed to the web server; and
    detecting, by the network security device, whether one or more online behavioral tracking tools are embedded within the HTTP request;
    removing from the HTTP request one or more online behavioral tracking tools that are not in compliance with the online privacy policy.

4. The method of claim 3, wherein the one or more online behavioral tracking tools comprise:
    an HTTP cookie;
    a web beacon;
    a local storage of a browser;
    a flash cookie; or
    a script that creates an online behavioral tracking tool when run by the client device.

5. The method of claim 1, further comprising:
    identifying, by the network security device, an application running on the client device that injected the private information within the data packet; and
    determining, by the network security device, the online privacy policy based on an identity of the application.

6. The method of claim 1, further comprising:
    determining, by the network security device, with reference to a device inventory table maintained within the private network a capability of the client device to inadvertently leak potentially private information; and
    determining, by the network security device, the online privacy policy for the network device based the determined capability.

7. The method of claim 1, wherein the one or more actions specified by the online privacy policy comprises one or more of:
    blocking the data packet from being transmitted to the server device;
    removing the private information and allowing the data packet to be transmitted to the server device;
    allowing the data packet to be transmitted to the server device;
    logging information regarding the data packet; and
    reporting information regarding the data packet to the administrator.

8. A network security device comprising:
    a non-transitory storage device having embodied therein instructions representing a security application; and one or more processors coupled to the non-transitory storage device and operable to execute the security application to perform a method comprising:

centrally maintaining a privacy policy set and a private information signature database by registering with the private information signature database (i) an Internet Protocol (IP) address or a media access control (MAC) address of a smart device known to have the ability to collect information regarding resources associated with a private network and (ii) applications having the ability to transmit crash reports to a third-party server, wherein the privacy policy set is defined by an administrator of the private network and includes a plurality of online privacy policies each specifying one or more actions to take when a particular type of private information is attempted to be transmitted outside of the private network;

identifying existence of private information contained in a data packet originated by a client device of a private network protected by the network security device and destined for a server device external to the private network by scanning the data packet for information matching a signature contained within the private information signature database, wherein the private information comprises environmental information associated with the private network or runtime information associated with the client device;

determining an online privacy policy of the plurality of online privacy policies applicable to the private information; and enforcing the online privacy policy on the data packet by performing the one or more actions specified by the online privacy policy to the data packet.

9. The network security device of claim 8, wherein the environmental information PM associated with the private network comprises one or more of:

local server information of the private network;
local directory information of the private network;
an unpublished Uniform Resource Locator (URL) of the private network; and
unpublished program codes of the private network.

10. The network security device of claim 8, wherein the server device comprises a web server and the method further comprises:

capturing a Hypertext Transfer Protocol (HTTP) request originated by the client device and directed to the web server; and detecting whether one or more online behavioral tracking tools are embedded within the HTTP request;

removing from the HTTP request one or more online behavioral tracking tools that are not in compliance with the online privacy policy.

11. The network security device of claim 10, wherein the one or more online behavioral tracking tools comprise:

an HTTP cookie;
a web beacon;
a local storage of a browser;
a flash cookie; or
a script that creates an online behavioral tracking tool when run by the client device.

12. The network security device of claim 8, wherein the method further comprises:

identifying an application running on the client device that injected the private information within the data packet; and determining the online privacy policy based on an identity of the application.

13. The network security device of claim 8, wherein the method further comprises:

determining with reference to a device inventory table maintained within the private network a capability of the client device to inadvertently leak potentially private information; and determining the online privacy policy for the network device based the determined capability.

14. The network security device of claim 8, wherein the one or more actions specified by the online privacy policy comprises one or more of:

blocking the data packet from being transmitted to the server device;
removing the private information and allowing the data packet to be transmitted to the server device;
allowing the data packet to be transmitted to the server device;
logging information regarding the data packet; and
reporting information regarding the data packet to the administrator.

* * * * *

UNITED STATES PATENT AND TRADEMARK OFFICE
CERTIFICATE OF CORRECTION

PATENT NO. : 10,212,134 B2
APPLICATION NO. : 15/228159
DATED : February 19, 2019
INVENTOR(S) : Upkar Singh Rai It is certified that error appears in the above-identified patent and that said Letters Patent is hereby corrected as shown below:

In the Claims

Claim 9:
Column 13, Line 36, delete "PM"

Signed and Sealed this
Second Day of April, 2019

Andrei Iancu
*Director of the United States Patent and Trademark Office*